United States Patent [19]

Leibinger et al.

[11] Patent Number: 4,619,448
[45] Date of Patent: Oct. 28, 1986

[54] STOP MECHANISM, PARTICULARLY FOR STAMPLING MACHINES

[75] Inventors: Berthold Leibinger, Gerlingen; Eugen Herb, Ditzingen, both of Fed. Rep. of Germany

[73] Assignee: Trumpf GmbH & Co., Ditzengen, Fed. Rep. of Germany

[21] Appl. No.: 474,438

[22] Filed: Mar. 11, 1983

[30] Foreign Application Priority Data

Mar. 12, 1982 [DE] Fed. Rep. of Germany ....... 3208989

[51] Int. Cl.⁴ ............................................. B23Q 3/00
[52] U.S. Cl. ................................... 269/303; 269/118; 269/244; 269/305; 269/320
[58] Field of Search ...................... 269/32, 91, 93, 94, 269/111, 118, 119, 120, 216, 244, 257, 289 MR, 303, 304, 305, 320, 117

[56] References Cited

U.S. PATENT DOCUMENTS

| | | | |
|---|---|---|---|
| 866,782 | 9/1907 | Geisendorfer | 269/303 |
| 1,342,891 | 6/1920 | Bergstrom | 269/117 |
| 3,593,984 | 7/1971 | Carman | 269/118 |
| 3,722,062 | 3/1973 | Gharaibeh | 29/703 |
| 3,967,817 | 7/1976 | McClocklin | 269/94 |

*Primary Examiner*—Frederick R. Schmidt
*Assistant Examiner*—Judy J. Hartman

[57] ABSTRACT

A machine tool employs a workpiece guidance system comprising a pair of guide assemblies each including a first stop member movable along one of the X and Y axes and a clamping element a second stop member for clamping the workpiece against the first stop member for movement therewith. The second stop member element is movable independently of its associated first stop member as well as therewith, and each stop member will provide a guide surface for the workpiece as it is moved past it by the other guide assembly. The machine tool also includes a computer system control for operating the motors which drive the guide assemblies.

4 Claims, 2 Drawing Figures

12,619,448

STOP MECHANISM, PARTICULARLY FOR STAMPLING MACHINES

BACKGROUND OF THE INVENTION

Coordinate guide and positioning systems are well known for the positioning of the workpiece in a wide variety of machine tools. Most of these mechanisms require relatively costly construction and control systems in order to achieve the desired precision location of the workpiece upon the worktable and the controlled movement thereof.

Prior to the development of automatic coordinate guide systems and even in some present machines which are of less costly and less complex character, there have been provided manually movable stops for the workpiece against which the workpiece is moved by the operator. Although such simple positioning mechanisms are sufficient to achieve the desired result, manipulation by hand is relatively difficult and labor intensive.

It is an object of the present invention to provide a novel machine tool having a relatively simple and effective guide and positioning mechanism for moving and guiding flat workpieces along X and Y axes.

It is also an object to provide such a machine tool wherein the guidance system is relatively economical and rugged in which the control system is relatively uncomplicated.

Another object is to provide such machine tool in which the workpiece is firmly clamped by simple and effective means to ensure its precise positioning as it is guided in its movement along the X and Y axes.

SUMMARY OF THE INVENTION

It has now been found that the foregoing and related objects can be readily obtained in a machine tool having a workpiece clamping and moving assembly for moving a workpiece in a horizontal plane and comprising a horizontal table having X and Y axes perpendicular to each other. A first workpiece guide assembly includes a stop member supported on the table for reciprocal movement along the X axis and means for clamping the associated workpiece against the stop member for movement therewith in either direction of reciprocal movement. The clamping means is movable relative to the stop member independently of movement of the stop member. A second workpiece guide assembly is provided and includes a stop member supported on the table for reciprocal movement along the Y axis and is similarly provided with means for clamping the workpiece against the stop member for movement therewith. This clamping means is also movable relative to its stop member independent of movement of the stop member. The machine tool also includes first and second drive means for the stop members of the first and second guide assemblies to effect reciprocal movement thereof along the X and Y axes, and control means for the first and second drive means to effect their operation independently of each other.

In accordance with one embodiment of the invention, the clamping means of each guide assembly comprises a second stop member supported on the table for relative movement towards and away from the first mentioned stop member independently of movement of the first mentioned stop member, and it is movable with the first mentioned stop member upon clamping of an associated workpiece therebetween for movement along the appropriate axis of that guide assembly. Generally, this embodiment will include a connecting element extending between the first mentioned and second stop members to effect movement of the second stop member towards the first stop member to clamp the workpiece therebetween, and means is provided for biasing the second stop member towards the first mentioned stop member.

The stop members are desirably configured to provide horizontally extending surfaces to support the workpiece thereon and vertically extending surfaces for aligning the workpiece thereon for movement about the table.

In accordance with another embodiment of the invention, the workpiece clamping means comprises a claw and means mounting the claw on the stop member. Operating means is provided for effecting movement of the claw between an open position and a closed position to clamp the associated workpiece against the horizontally extending surface on the stop member. The control means generally controls the means for effecting movement of the claw for automatically opening and closing it upon the workpiece. The control means also may include means for sensing whether the claw is in the closed position and for preventing movement of the other guide means when the claw is so closed.

Each of the stop members may desirably include vertically extending positioning pins for positively locating the associated workpiece on the stop members, and these locating pins may be adjustable vertically on the stop members so as to be movable into a position projecting above the bottom plane of the associated workpiece and to an inoperative position therebelow. These locating pins are desirably rotatable about a vertical axis so as to facilitate sliding movement of the workpiece thereby.

The control means is desirably a numerical control system which will control not only the drive mechanisms for the guide assemblies but also the clamping means and, where employed, the mechanism for raising and lowering the positioning pins.

DETAILED DESCRIPTION OF THE ILLUSTRATED EMBODIMENTS

Figure 1:
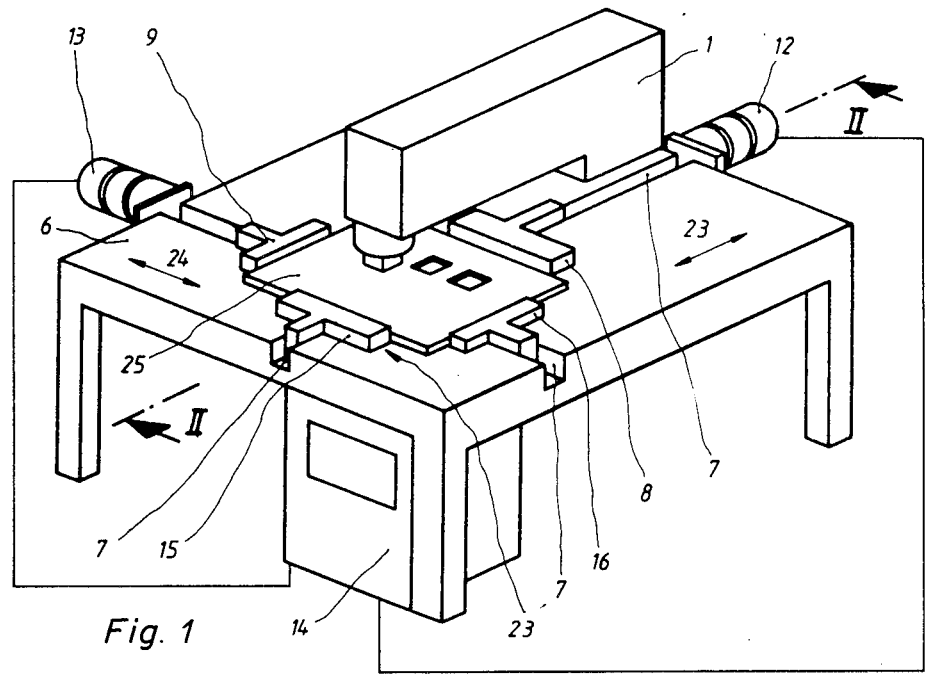
FIG. 1 is a partially diagrammatic perspective view of a machine tool embodying the novel workpiece moving and guide assembly of the present invention.
Figure 2:
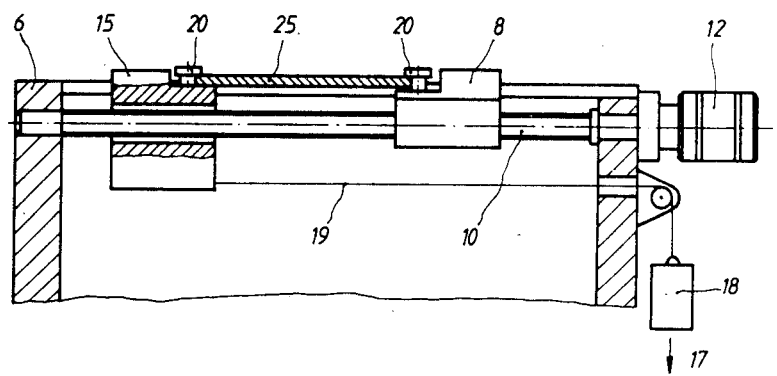
FIG. 2 is a fragmentary sectional view of the machine tool of FIG. 1 along the line II—II of FIG. 1.

Turning first to FIGS. 1 and 2 of the attached drawings, the machine tool 1 has a worktable or bed 6 provided with a pair of channels 7 extending at right angles to each other to define X and Y axes and in which are slidably seated the stop members 8 and 9 which are reciprocated in the channels 7 by the independently actuatable drive motors 12 and 13.

As seen in FIG. 2, the drive motor 12 is connected to a spindle 10 upon which the movable stop member 8 is threadably engaged so that rotation of the motor in either direction will cause the stop member 8 to move axially along the spindle 10.

The guide assemblies also include second stop members 15 and 16 which are slidable in the channels 7 and are movable independently of the movement of the stop members 7 and 8. As seen in FIG. 2, the stop member 15 has connected thereto a cable 19 which carries at its end a weight 18 generating a biasing force indicated by the arrow and numeral 17. As a result, the stop member 15 will be biased or moved towards the stop member 8 and thereby clamp a workpiece 25 therebetween, but such biasing force can be readily overcome manually or by the motors 12, 13.

When the spindle 10 is rotated by the motor 12, the workpiece 25 will be moved along the axis defined by the spindle 10 since it is clamped securely between the stop members 8 and 15. If the movement is to the right as seen in FIG. 2, the weight 18 causes the stop member 15 to remain tightly against the workpiece 25, and the several members move simultaneously. If the stop member 8 is moved to the left, the motor 12 overcomes the biasing force of the weight 18 and pushes both the workpiece 25 and the stop member 15.

If the motor 13 is operated to drive the stop member 9 in either direction in its channel 7, the workpiece 25 is guided by the vertically extending pins 20 as it moves thereby. To reduce the frictional resistance to the sliding movement of the workpiece 25 past the pins 20, they are desirably supported on the stops 8, 9 and 15, 16 for rotation about a vertical axis.

Figure 3:
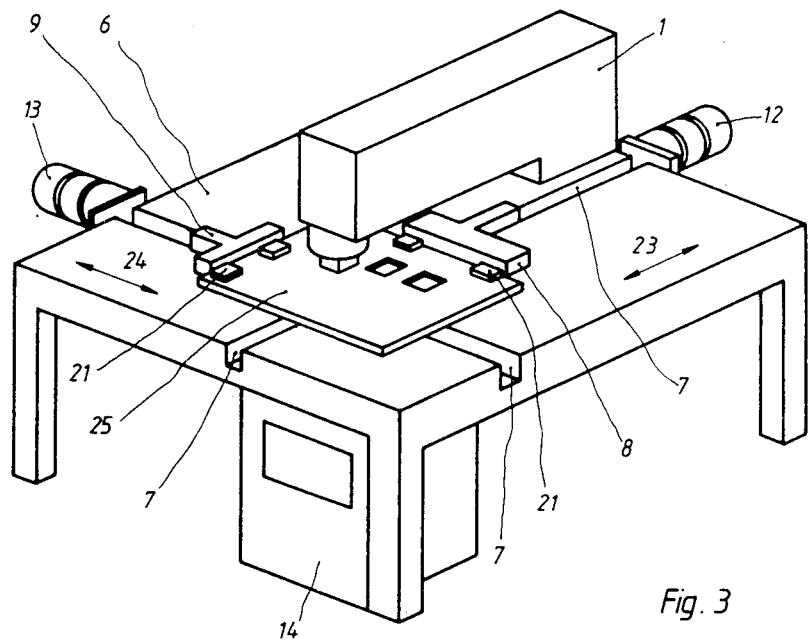
FIG. 3 is a partially diagrammatic perspective view of the machine tool embodying another embodiment of the workpiece guidance system of the present invention.
Figure 4:
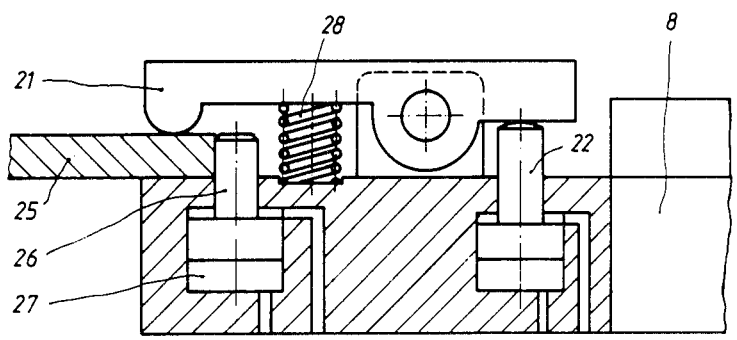
FIG. 4 is a partially diagrammatic fragmentary sectional view of one of the stop members showing the clamping mechanism, and the hydraulic mechanism for actuating the locating pins and clamping mechanism.

In the embodiment of FIGS. 3 and 4, the means for clamping the workpiece 25 against the stop members 8, 9 comprises clamping arms or claws 21 which are pivotably mounted on the stop members 8, 9. The claws 21 are biased into an open or workpiece releasing position by the compression springs 28 and are closed by movement upwardly of the piston 22 in response to the introduction of hydraulic fluid to the lower portion of the cylinder in which the piston 22 reciprocates. When the cylinder is depressurized, the spring 28 will open the claw 21. Ordinarily, the claw 21 of a stop member 8, 9 will be opened to receive a workpiece 25 and when the other stop member is actuated to move the workpiece 25 along the axis extending thereby.

In this embodiment, the stop members 8, 9 include vertically extending positioning pins 26 which provide means for precisely positioning the workpiece 25 when it is first engaged, as is seen in FIG. 4. After the claw 21 has been actuated to firmly clamp the workpiece 25, the pins 26 may be moved downwardly by suitable movement means for effecting vertical movement of the pins. In the illustrated embodiment, this vertical movement of the pins is effected by piston/cylinder action of a hydraulic mechanism wherein the downward movement is effected by movement means, i.e., by introduction of hydraulic fluid under pressure to the upper portion of the cylinder 27. By control of the hydraulic pressure on the opposite sides of the piston, the vertical height of projection of the pins 26 may be varied. Normally, once the claws 21 have been engaged so that the workpiece 25 is firmly secured, the pins 26 are retracted below the plane of the horizontal support surface of the stop members 8, 9 so that the workpiece 25 may freely slide thereon in response to the motion induced by the other stop member.

To control the drive motors 12 and 13 and the hydraulic mechanisms for the pistons 22 and pins 26, a numerical control system 14 is provided. In the embodiment of FIGS. 3 and 4, the numerical control system 14 will not permit operation of the drive motors 12 and 13 if the claw 21 of the other stop member 8 and 9 is in the clamping position. Accordingly, it must be released to effect the reposition of the workpiece 25 and it is thereafter reengaged.

Thus, it can be seen from the foregoing specification and attached drawings that the novel guidance system of the present invention is relatively simple and effective, is rugged and will provide precise positioning of the workpiece. This system may be fabricated at relatively low cost to provide a long-lived assembly.

Having thus described the invention, what is claimed is:

1. A machine tool having a workpiece clamping and moving assembly for moving a workpiece in a horizontal plane and comprising:
   A. a horizontal table having X and Y axes prependicular to each other;
   B. first and second workpiece guide assemblies each including a first stop member supported on said table for reciprocal movement along an axis of said table and means for clamping an associated workpiece against each respective first stop member for movement therewith in the same direction as said stop member during its reciprocal movement, said clamping means of each guide assembly including a second stop member supported on said table for relative movement towards and away from the respective first stop member of the respective guide assembly independently of any movment of the first stop member thereof, and means to effect movement of said second stop member toward said respective first stop member to clamp the associated workpiece therebetween, said first stop member and clamping means of said first guide assembly being movable along said X-axis and said first stop member and said clamping means of said second guide assembly being movable along said Y-axis;
   C. first and second drive means for said first stop members of said first and second guide assemblies respectively for effecting reciprocal movement thereof along said X and Y axes, said reciprocal movement of each of said first stop members producing concurrent reciprocal movement of an associated workpiece and concurrent reciprocal movement of the associated clamping means of that guide assembly to thereby effect controlled movement of an associated workpiece along said X and Y axes; and
   D. control means for said first and second drive means for effecting operation thereof independently of each other.

2. The machine tool in accordance with claim 1 wherein said movement effecting means includes means biasing said second stop member toward said respective first stop member.

3. The machine tool in accordance with claim 1 wherein said first stop members of each of said workpiece guide assemblies are configured to provide horizontally extending surfaces and vertically extending surfaces for supporting and aligning the associated workpiece thereon for movement about said table.

4. The machine tool in accordance with either of claim 1 in which said control means is a numeric control system.

* * * * *

UNITED STATES PATENT AND TRADEMARK OFFICE
CERTIFICATE OF CORRECTION

PATENT NO. : 4,619,448

DATED : October 28, 1986

INVENTOR(S) : Berthold Leibinger, Eugen Herb

It is certified that error appears in the above-identified patent and that said Letters Patent is hereby corrected as shown below:

In the Title: "STAMPLING" should be --STAMPING--.

Signed and Sealed this

Eighteenth Day of August, 1987

Attest:

DONALD J. QUIGG

*Attesting Officer*  *Commissioner of Patents and Trademarks*